(12) United States Patent
Lee et al.

(10) Patent No.: US 11,926,360 B1
(45) Date of Patent: Mar. 12, 2024

(54) FOLDABLE BABY STROLLER APPARATUS

(71) Applicants: Katharine L. Lee, Rockport, ME (US); W. Davis Lee, Rockport, ME (US)

(72) Inventors: Katharine L. Lee, Rockport, ME (US); W. Davis Lee, Rockport, ME (US)

( * ) Notice: Subject to any disclaimer, the term of this patent is extended or adjusted under 35 U.S.C. 154(b) by 0 days.

(21) Appl. No.: 17/899,516

(22) Filed: Aug. 30, 2022

(51) Int. Cl.
*B62B 7/06* (2006.01)
*A47C 4/02* (2006.01)

(52) U.S. Cl.
CPC ............... *B62B 7/064* (2013.01); *A47C 4/02* (2013.01)

(58) Field of Classification Search
CPC .... A47C 5/08; A47C 5/10; B62B 7/06; B62B 7/064; B62B 7/062; B62B 1/12; B62B 1/206; B62B 3/02
See application file for complete search history.

(56) References Cited

U.S. PATENT DOCUMENTS

| | | | | |
|---|---|---|---|---|
| 4,215,877 A * | 8/1980 | Pritchett | ................. | B62B 1/208 403/291 |
| 4,421,356 A * | 12/1983 | Singer | ..................... | A47C 4/02 297/452.17 |
| 4,810,029 A * | 3/1989 | Kaladis | .................... | A47C 5/10 297/16.2 |
| 5,180,208 A * | 1/1993 | Lawandi | .................. | A47C 4/02 403/322.2 |
| 5,423,341 A * | 6/1995 | Brady | ..................... | E04H 15/48 135/147 |
| 5,709,428 A * | 1/1998 | Hugghins | ................ | A47C 4/48 297/16.2 |
| 5,820,141 A * | 10/1998 | Wilkerson | ............ | B62B 5/0023 280/30 |
| 6,038,802 A * | 3/2000 | Tidwell | ............... | G09F 15/0025 40/610 |
| 6,062,648 A * | 5/2000 | Adler | ....................... | A47C 4/02 297/42 |
| 6,557,572 B2 * | 5/2003 | Lah | ......................... | E04H 15/48 403/368 |
| 6,811,178 B2 * | 11/2004 | Tomasi | ................... | B62B 7/064 280/650 |
| 7,374,237 B2 * | 5/2008 | Park | ......................... | A47C 4/48 297/16.2 |
| 7,537,187 B2 * | 5/2009 | Park | ....................... | A47C 17/70 248/200 |
| 8,454,084 B2 * | 6/2013 | Lah | ......................... | A47C 9/105 297/16.2 |
| 8,696,015 B2 * | 4/2014 | Karremans | ............ | B62B 7/064 280/647 |

(Continued)

FOREIGN PATENT DOCUMENTS

WO   WO-2017036730 A1 * 3/2017 ............... B62B 7/06

*Primary Examiner* — Emma K Frick
(74) *Attorney, Agent, or Firm* — Kevin H. Hazen; Hazen Patent Group, LLC

(57) ABSTRACT

The invention comprises an apparatus, comprising: a baby stroller, comprising: a set of handles; a set of wheels; a foldable frame, the foldable frame comprising at least three hollow tubes and an elastic cord running through the at least three hollow tubes, the foldable frame attaching the set of handles to the set of wheels; and a baby seat attached to the foldable frame. Optionally, the three hollow tubes are members of a set of at least eight hollow tubes with the elastic cord passing through the at least eight hollow tubes with a tension of two to five pounds within at least one tube.

10 Claims, 7 Drawing Sheets

(56) References Cited

U.S. PATENT DOCUMENTS

| | | | | |
|---|---|---|---|---|
| 8,899,686 B1* | 12/2014 | Kim | ................ | A47C 4/286 |
| | | | | 297/440.11 |
| 9,351,578 B2* | 5/2016 | Homans | ................ | A47C 4/02 |
| 9,834,243 B1* | 12/2017 | Zhang | ................ | B62B 7/086 |
| 9,930,966 B2* | 4/2018 | Yang | ................ | A47C 4/286 |
| 10,201,231 B2* | 2/2019 | Homans | ................ | A47C 7/008 |
| 10,342,351 B2* | 7/2019 | Lenhart | ................ | A47C 4/286 |
| 10,556,164 B2* | 2/2020 | Donley | ................ | A63B 63/004 |
| 11,191,362 B1* | 12/2021 | Brinkley | ................ | A45F 3/24 |

* cited by examiner

FOLDABLE BABY STROLLER APPARATUS

BACKGROUND OF THE INVENTION

Field of the Invention

The invention relates generally to a foldable baby stroller.

Discussion of the Prior Art

Problem

There exists in the art a need for a foldable stroller that is small when folded, readily assembled, and lightweight.

SUMMARY OF THE INVENTION

The invention comprises a foldable baby stroller apparatus and method of use thereof.

DESCRIPTION OF THE FIGURES

A more complete understanding of the present invention is derived by referring to the detailed description and claims when considered in connection with the Figures, wherein like reference numbers refer to similar items throughout the Figures.

Elements and steps in the figures are illustrated for simplicity and clarity and have not necessarily been rendered according to any particular sequence. For example, steps that are performed concurrently or in different order are illustrated in the figures to help improve understanding of embodiments of the present invention.

DETAILED DESCRIPTION OF THE INVENTION

The invention comprises an apparatus, comprising: a baby stroller, comprising: a set of handles; a set of wheels; a foldable frame, the foldable frame comprising at least three hollow tubes and an elastic cord running through the at least three hollow tubes, the foldable frame attaching the set of handles to the set of wheels; and a baby seat attached to the foldable frame. Optionally, the three hollow tubes are members of a set of at least eight hollow tubes with the elastic cord passing through the at least eight hollow tubes with a tension of two to five pounds within at least one tube.

Herein, a z-axis is aligned with gravity and an x/y-plane is perpendicular to the z-axis, such as a floor surface.

Foldable Stroller

Figure 1:
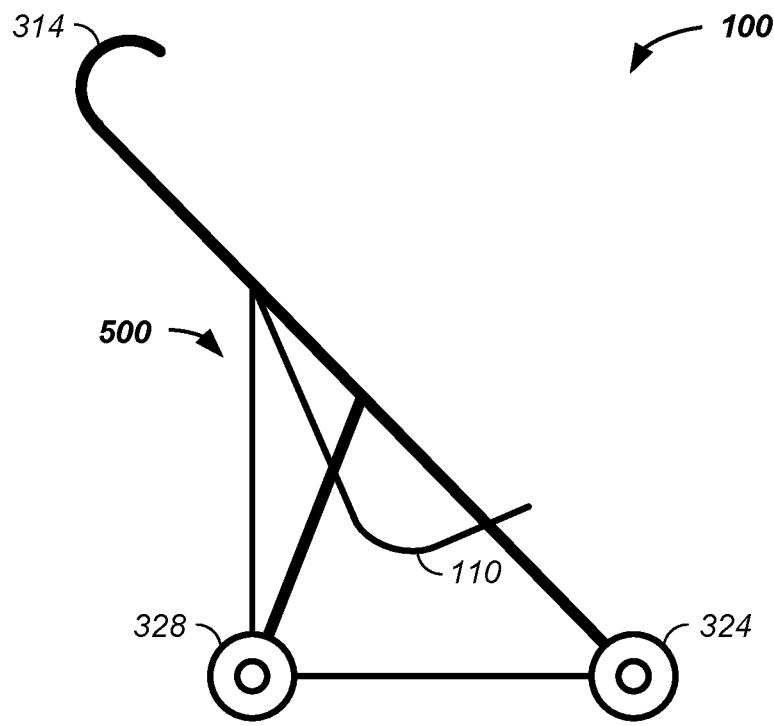
FIG. 1 illustrates a stroller.

Referring now to FIG. 1, a foldable stroller 100 is illustrated. Generally, the foldable stroller 100 includes a set of wheels, a foldable frame, a pair of handles, and a seat 110 attached to the foldable frame, such as for holding an infant or a toddler. Elements of the foldable stroller 100 are further described, infra.

Figure 2:
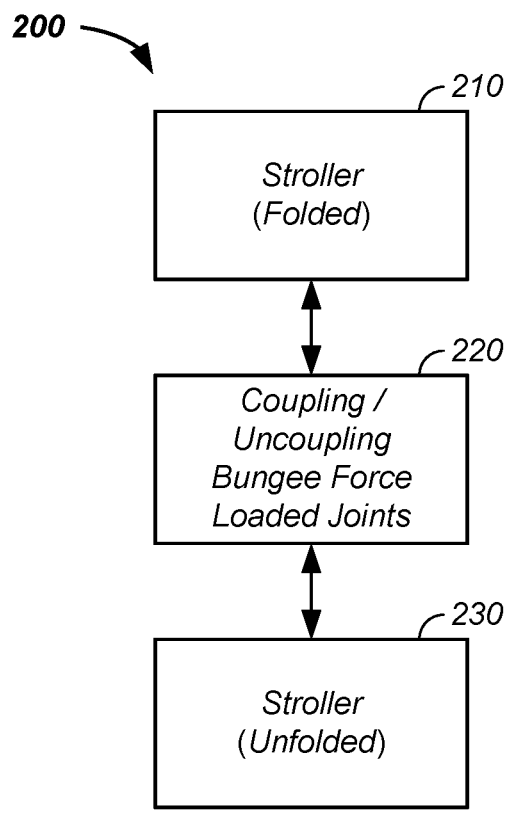
FIG. 2 illustrates a method of folding a foldable stroller.

Referring now to FIG. 2, a method of folding/unfolding 200 a stroller is described. Generally, a folded stroller 210 passes through an unfolding step 220 where a force/strain loaded bungee cord aids in aligning and pulling together joints of the stroller, which results in an unfolded stroller 230. Stated again, a bungee cord, further described infra, runs through joints of a stroller. The bungee thus aids in alignment of adjacent segments of the stroller. Further, the force of the bungee aids in pulling together the adjacent segments of the stroller. The multiple segments of the stroller are also further described, infra. Herein, a bungee cord or bungle or shock cord is an elastic cord composed of one or more elastic strands forming a core, usually covered in a woven cotton or polypropylene sheath. The sheath does not materially extend elastically, but it is braided with its strands spiraling around the core so that a longitudinal pull causes it to squeeze the core, transmitting the core's elastic compression to the longitudinal extension of the sheath and cord. Optionally, the bungee cord is a cord, a natural fiber cord, an aramid cord, a nylon cord, a synthetic fiber cord, and/or an elastic cord. Optionally, the bungee cord is replaced by a tensioning system and a stiff cord, such as a steel cable.

Figure 3:
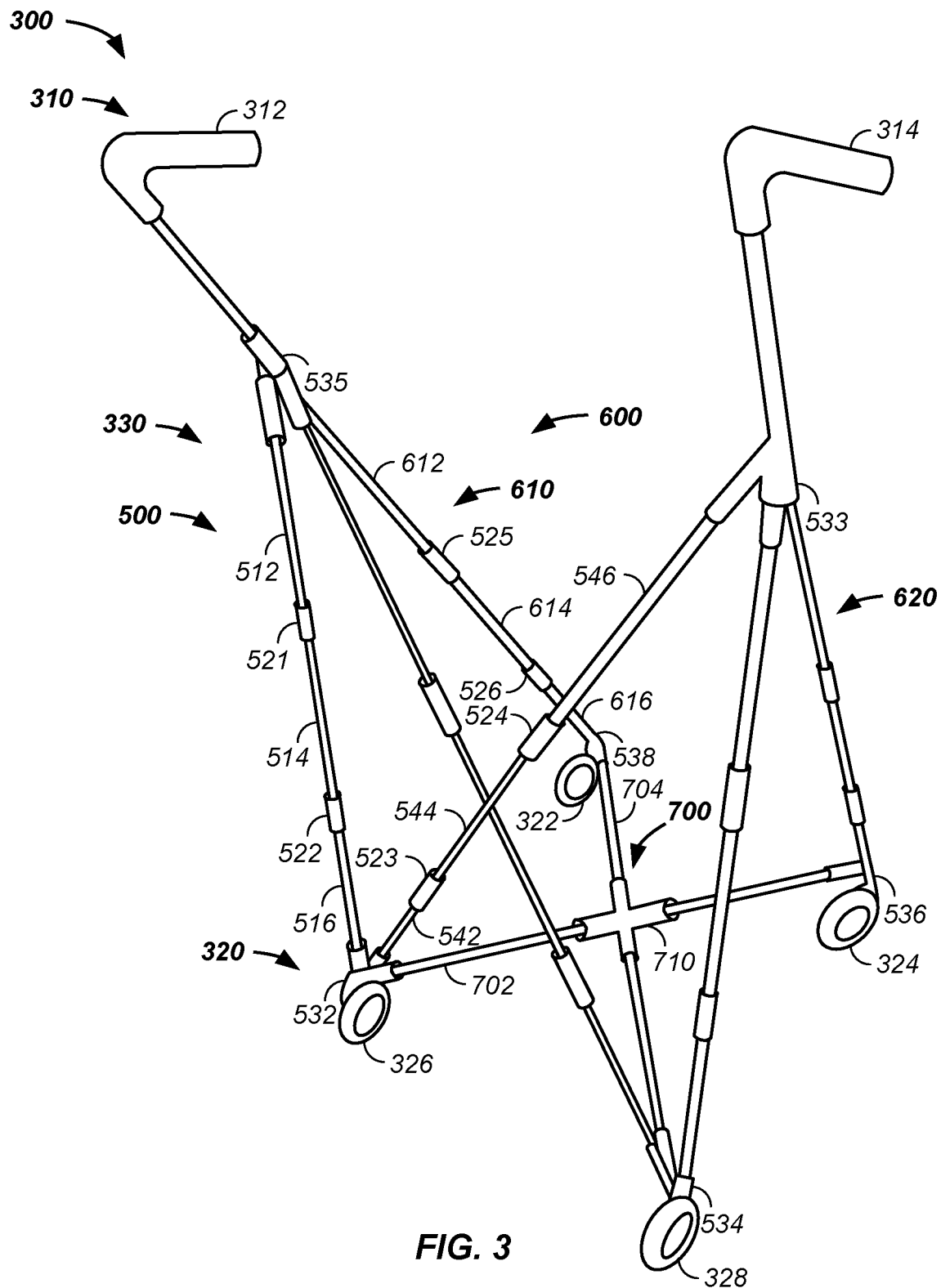
FIG. 3 illustrates a foldable/segmented stroller.

Referring now to FIG. 3, the foldable stroller 100 is further described with an exemplary foldable stroller 300. The exemplary foldable stroller 300 includes handles 310, wheels 320, and a foldable frame 330. In this example, the foldable frame contains an optional back section 500, and optional side section 600, and an optional base section 700. The exemplary foldable stroller 300 is presented for clarity of presentation and without loss of generality. For instance, a given section of the stroller, such as a support post, optionally contains 2, 3, 4, or more sub-sections that are folded. Several examples are provided, infra, to further describe the exemplary foldable stroller, illustrated in FIG. 3, and the foldable stroller 100.

Example I

Still referring to FIG. 3, the exemplary foldable stroller 300, includes two handles 310, a left handle 312 and a right handle 314. Generally, any number of stroller handles are optionally used. The exemplary foldable stroller 300, includes a set of wheels 320, such as 1, 2, 3, 4, or more wheels. As illustrated, the set of wheels 320 includes a front left wheel 322, a front right wheel 324, a back left wheel 326, and a back right wheel 328. The exemplary foldable stroller 300 contains many frame sections. Generally, the foldable stroller 100 contains any number of frame sections and/or frame sub-sections.

Example II

Figure 4:
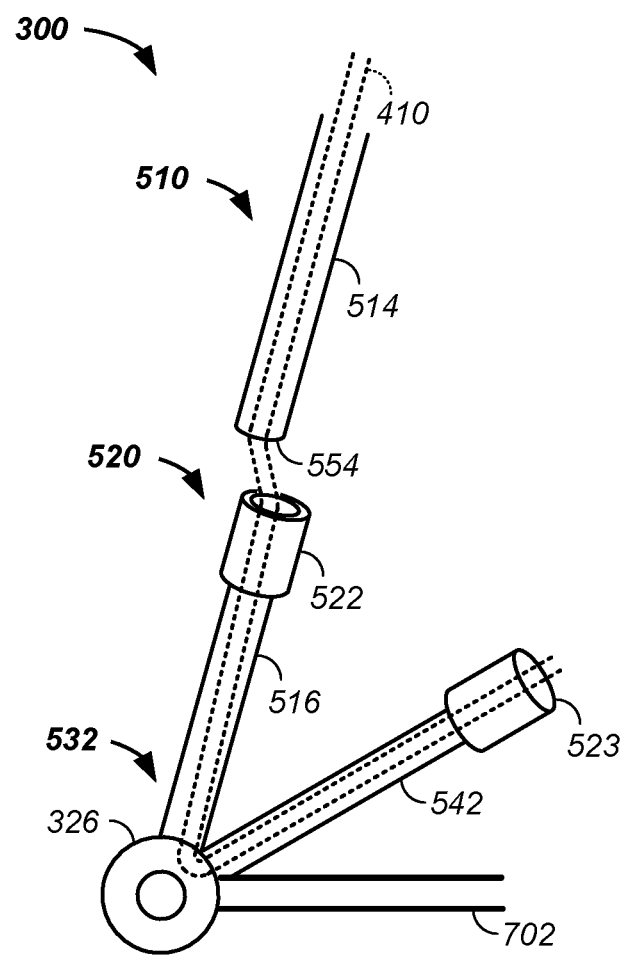
FIG. 4 illustrates a bungee tension system.

Referring now to FIG. 4, the bottom left corner of the exemplary foldable stroller 300 is illustrated. As illustrated, a bungee cord 410, preferably under a tension force/strain, such as one-half pound of tension to ten pounds of tension and preferably two to five pounds of tension along a linear axis. As illustrated, a first set of vertical frame sections 510 are coupled with a set of couplers 520.

Particularly, a second vertical frame section 514 comprising a first end 554 is coupled into a second coupler 522, which is connected to a third vertical frame section 516. Generally, the bungee 410 aids in alignment of the first end 554 of the second vertical frame section 514 into the second coupler 522 attached to the third vertical frame section 516 and/or the force of the bungee 410 aids in forcing the second and third vertical frame sections 514, 516 together. Optionally and preferably, when picking up the folded stroller, the bungee basically pulls the stroller into a final shape where the user merely needs to assist not at all or with the final connection of a limited number of joints that are already basically aligned by the bungee or fully joined by the bungee. Notably, the "vertical" means that the first set of vertical frame sections 510 couple along at least one axis within thirty degrees of vertical, and preferably within less than 20, 15, or 10 degrees of vertical.

Example III

In the second example, described supra, the bungee 410 connected two segments. In this example, still referring to FIG. 4, the bungee 410 connects at least three segments. As illustrated, the first set of vertical frame sections 510 illustrated in FIG. 3, are additionally attached mechanically and with use of the bungee 410 to a first rising section 542 of the foldable stroller 100. Particularly, the third vertical frame section 516 attached to a four way connector, such as a first four-way fixed wheel connector 532. The four way connector additionally attaches to the back left wheel 326 and a first base segment 702 of the base section 700, as described infra. Of note here is that the bungee 410 optionally routes from the first set of vertical frame sections 510 to the first rising section 542 and optionally to a third connector 523. Thus, optionally and preferably, the bungee 410 aids in aligning and/or providing a connecting force two at least two frames sections, the third vertical frame section 516 and the first rising section 542, which are attached to a wheel, the left back wheel 326 as illustrated, via the first four-way fixed wheel connector 532. As described, infra, one or more bungee cords are optionally and preferably used to align and connect multiple sections of the foldable stroller 100.

Referring again to FIG. 3 and still referring to FIG. 4, remaining elements of the exemplary foldable stroller 300 are described. The back section 500 optionally includes the first set of vertical frame sections 510, such as sequential connections of a first vertical frame section 512, a first coupler 521, a second vertical frame section 514, a second coupler 522, and a third vertical frame section 516. As illustrated, the exemplary foldable stroller 300 contains a second set vertical frame sections from the back right wheel 328 to the right handle 314, where similar and preferably identical foldable sections are present. The back section 500 also, optionally, includes a first rising cross member section from the left back wheel 326 to the right handle 314 that includes a first rising section 542, a third coupler 523, a second rising section 544, a fourth coupler 524, and a third rising section 546. A second rising cross member section from the right back wheel 328 to the left handle 312 optionally and preferably contains the same elements as the first rising cross member section. The exemplary foldable stroller 300 is also illustrated with an optional side section 600. A first side support includes, sequentially connected, a first side section 612, a fifth coupler 525, a second side section 614, a sixth coupler 526, and a third side section 616 going from the left handle 312 to the left front wheel 322. A second side support, from the right handle 314 to the right front wheel 324, optionally and preferably contains identical elements as the first side support. The exemplary foldable stroller 300 also includes an optional base section 700. As illustrated the base section includes a first base section 702, a second base section 704, a third base section 706, and a fourth base section 708 connected to a four connection joint 710, such as a planar four way connector. As illustrated, opposite ends of the four base section 702, 704, 706, 708 are connected to a pair of four way fixed wheel connectors 532, 534, and a pair of three way pivot wheel connectors 536, 538. The exemplary foldable stroller 300 also optionally contains a pair of four-way connectors 533, 535 connecting the handles to the vertical frame sections, rising frame sections, and side sections, as illustrated.

Example IV

Figure 5:
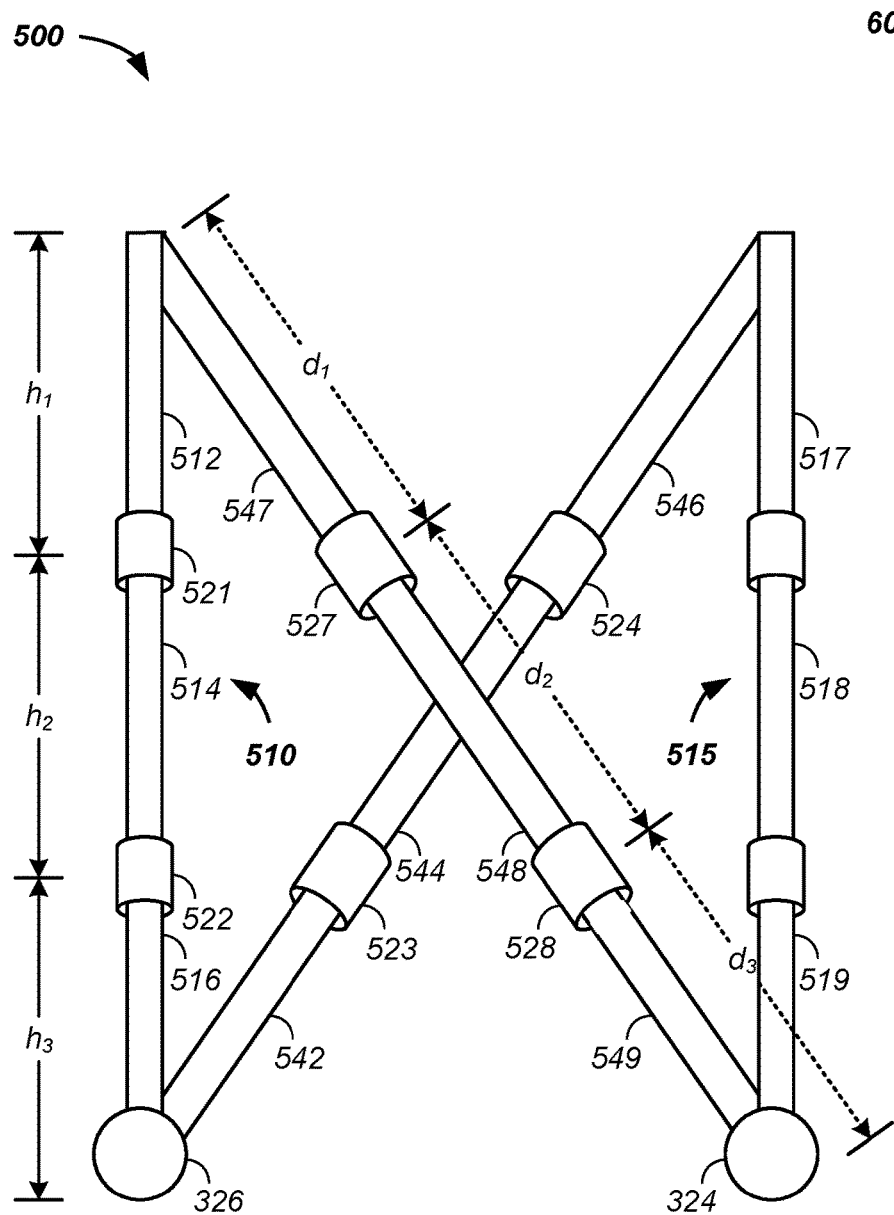
FIG. 5 illustrates a back section of a frame.

Referring now to FIG. 5, the back section 500 of the exemplary foldable stroller 300 is further described. In this example, folding the first set of vertical frame sections 510 coupled with the set of couplers 520 is described. Generally, having about equally sized sections, when the sections are folded, the overall length is decreased as opposed to having one long section sticking out from a folded bunch. See for instance FIG. 9. Referring still to FIG. 5, the first set of vertical frame sections of: a first height, $h_1$, or length of the first vertical frame section 512, a second height, $h_2$, or length of the second vertical frame section 514, and a third height, $h_3$, or length of the third vertical frame section 516 plus the left back wheel 326 are preferably equal, or about equal in height/length. Here, about equal means: (1) the second height is within twenty percent of the first height; (2) the first height and the second height are greater than a length of the third vertical frame section without the wheel; and/or (3) the shortest element of the three vertical frame sections 512, 514, 516 is within 35, 30, 25, or 20 percent of the longest of the three vertical frame sections 512, 514, 516. Said again, by having the three vertical frame sections be of about equal length, when each section is decoupled from their respective coupler(s), the bungee allows the sections to be folded to be approximately parallel sub-sections, see FIG. 9, and to be folded into a bundle of elements of about equal length, which aids in packing the stroller into a tube, elongated bag, or tied into a roughly cylindrical shape. A second set of vertical frame sections 515 from the right back wheel 324 to the right handle 314 comprising a fourth, fifth, and sixth vertical frame sections 517, 518, 519 optionally and preferably has similar and/or matching lengths compared to the first set of vertical frame sections 510 and is similarly folded into approximately parallel sections, such as within 15 degrees of each other, the angle being between sequential folded tubes of the stroller.

Example V

Figure 9:
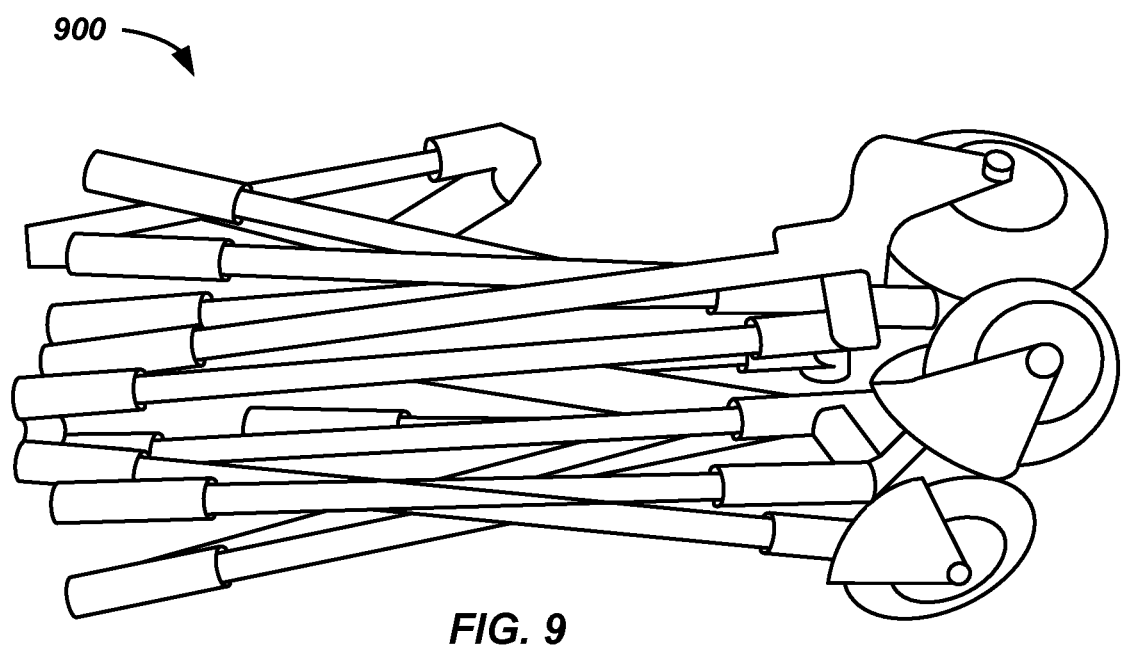
FIG. 9 illustrates a folded stroller.

Referring still to FIG. 5, each longitudinal section of the frame 500 of the foldable stroller 100 is optionally and preferably folded into about equal lengths. For instance, just as the first and second set of vertical frame sections 510, 515 folded into three about, within 15%, parallel sub-sections, a first set of cross-section members 541 and a second set of cross-section members 545 are also foldable into about parallel sections. Particularly, the first set of cross-section members 541 of a first rising section 542, a second rising section 544, and a third rising section 546 fold into about parallel sections with a connected bungee in a manner similar to as described above for the first set of vertical frame sections 510. Similarly, the second set of cross-section members 545 of a fourth rising section 547, a fifth rising section 548, and a sixth rising section 549 each fold into about parallel sections with a connected bungee in a similar manner as to described above for the first set of vertical frame sections 510. Notably, all of the back sections fold into a bundle of about parallel sub-sections. Indeed, all of the frame members optionally and preferably fold, while still connected to each other by the bungee 410, into a bundle of about parallel sub-sections as illustrated in FIG. 9. Each of the first and second set of cross-section members 510, 515 are of about equal length. For example, the fourth rising section 547 has a first length, $d_1$, the fifth rising section 548 has a second length, $d_2$, and the fifth rising section 549 has a third length, $d_3$, where equal lengths allows a folded about parallel bundle of lengths, such as in FIG. 9. As above, optionally and preferably the shortest length of $d_1$, $d_2$, and $d_3$, is optionally within 35, 30, 25, 20, 15, 10, or 5% of the longest length of $d_1$, $d_2$, and $d_3$. The same is optionally and preferably true for the first set of cross-section members 510.

Example VI

Figure 6:
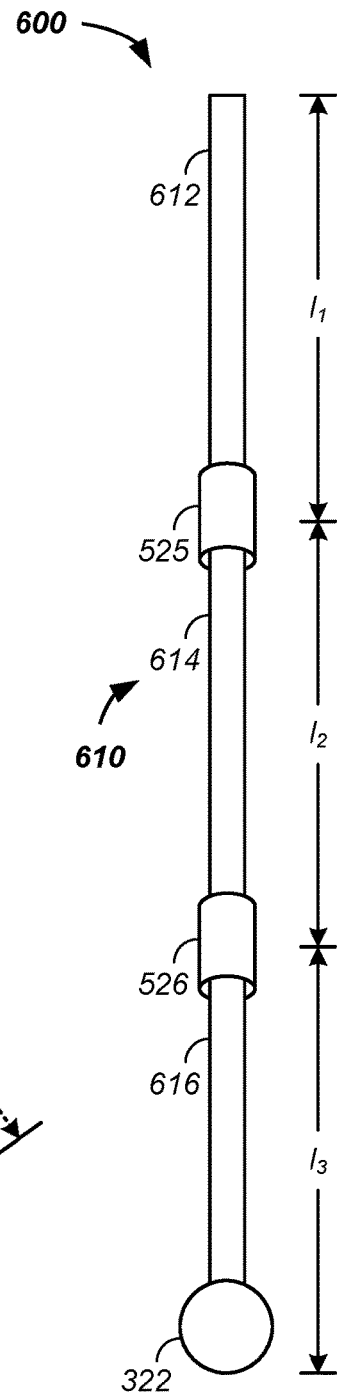
FIG. 6 illustrates a side section of a frame.
Figure 7:
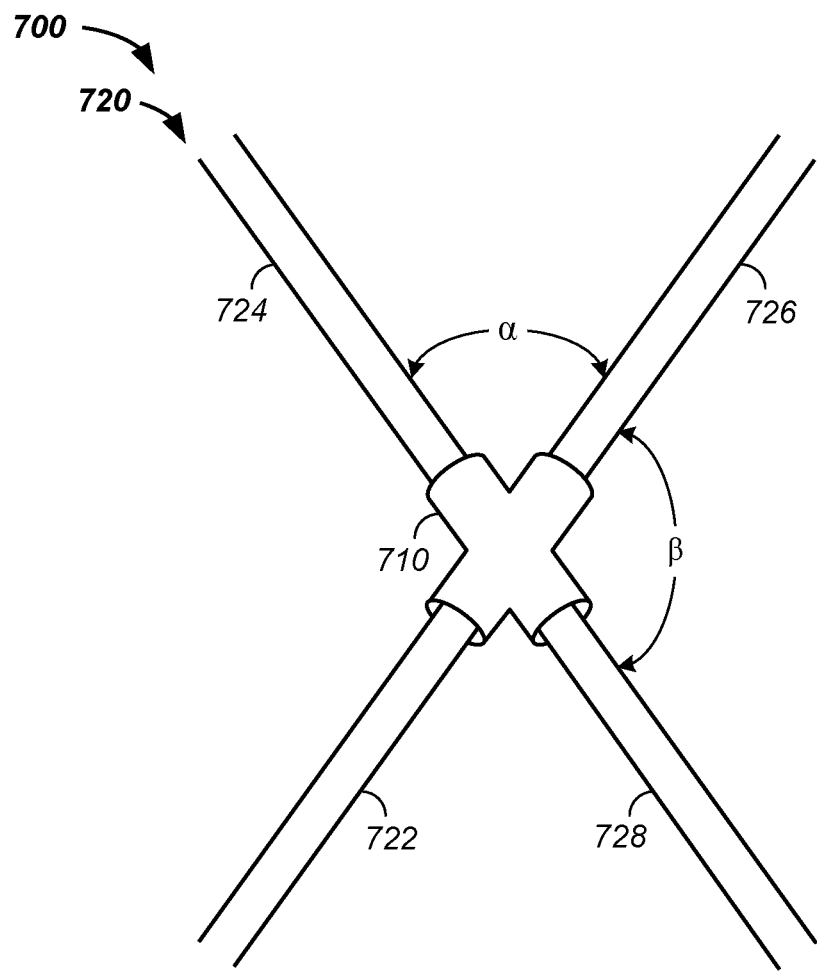
FIG. 7 illustrates a base section of a frame.

Each longitudinal section of the frame 500 of the foldable stroller 100 is optionally and preferably folded into about equal lengths. For instance, just as the first and second set of vertical frame sections 510, 515 folded into three about parallel sections, referring now to FIG. 6, a first set of side members 610 and a second set of side members 620 (FIG. 3) are also foldable into about parallel sections.

Particularly, a first side member 612 of a first length, $I_1$, coupled with a fifth connector 525 to a second side member 614 of a second length, $I_2$, which is in turn coupled with a sixth connector 526 to a third side member 616 of a third length, $I_3$, are foldable into the parallel bundle illustrated in FIG. 9. Again, the first, second, and third lengths, $I_1$, $I_2$, and $I_3$, are preferably equal in length. Generally, a shortest length of a shortest member of $I_1$, $I_2$, and $I_3$ is within 35, 30, 25, 20, 15, 10, or 5% of a longest length of a member of $I_1$, $I_2$, and $I_3$. Referring now to FIG. 3, the second set of side members 620 are similarly configured.

For any of the above example of three in series linear sections, optionally each linear section of the frame comprises 2, 3, 4, 5, 6, or 7 sub-sections.

Example VII

The base section 700 of the stroller is also optionally foldable. In this example, a four connection joint 710, such as a planar four connection joint, connects four base sections to the four tires, respectively. For instance, a first base section 722 connects to the four connection joint 710 and the back left wheel 326 and/or 4-way connector 532 thereof; a second base section 724 connects to the four connection joint 710 and the left front wheel 322 and/or first 3-way connector 538 thereof; a third base section 726 connects to the four connection joint 710 and the right front wheel 324 and/or second three-way connector 536 thereof; and a fourth base section 728 connects to the four connection joint 710 and the right rear wheel 328 and/or second fixed wheel four way connector 534 thereof. Optionally and preferably a first angle, a, formed by the second base section 724, four connection joint 710, and the third base section 726 is smaller than a second angle, β, formed by the third base section 726, four connection joint 710, and the fourth base section 728. The first angle is preferably 90 degrees or less and is more preferably less than 88, 86, 84, or 82 degrees, and in one case is 80.5±5 degrees. The first angle is preferably 90 degrees or more and is more preferably greater than 92, 94, 96, or 98 degrees, and in one case is 99.5±5 degrees.

Any of the frame elements are elongated solid tubes or more preferably are elongated hollow tubes.

Example VIII

Figure 8:
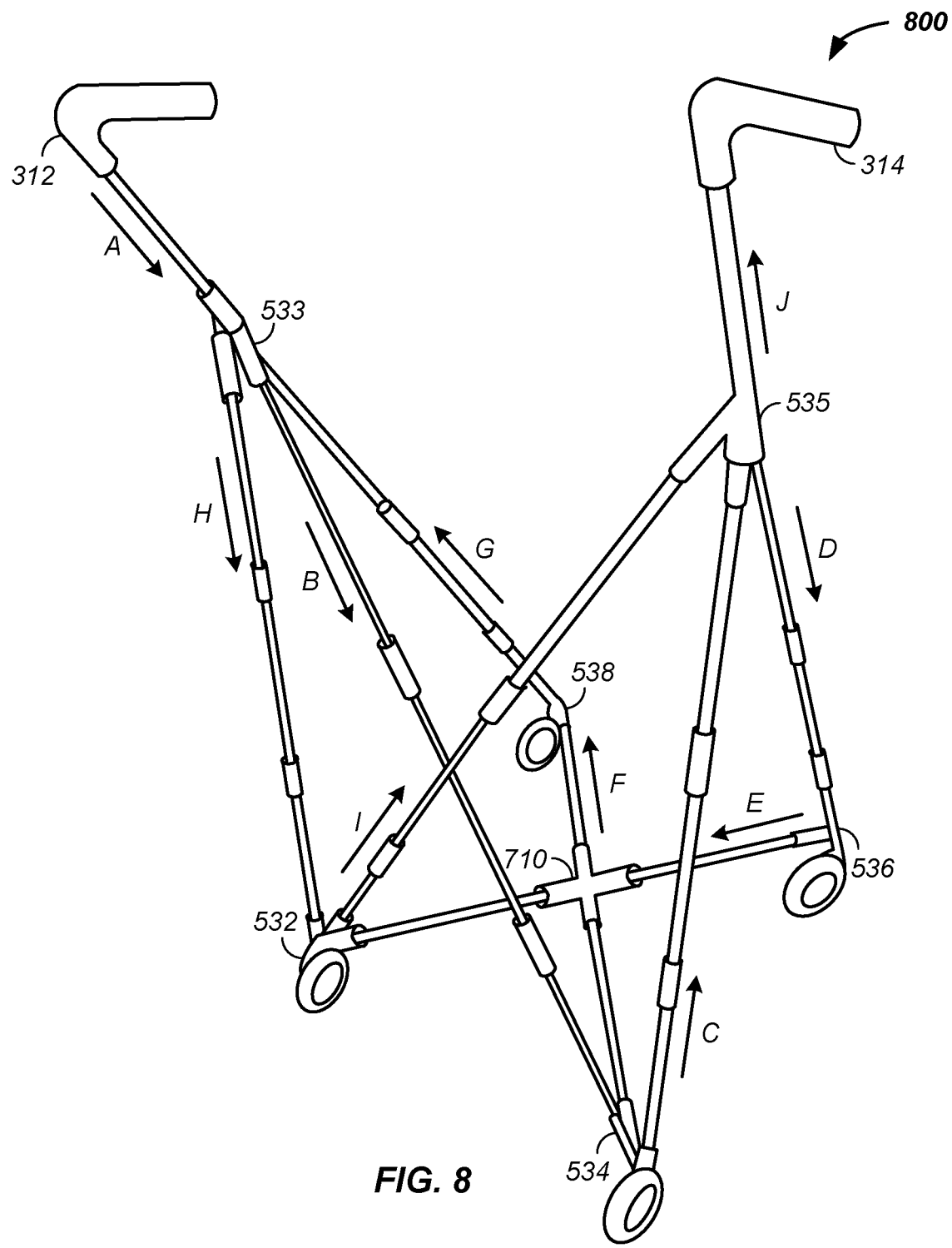
FIG. 8 illustrates an exemplary bungee tension path.

Referring now to FIG. 8, one or more bungee type cords run through one or more sections of the frame of the foldable stroller 100. Optionally and preferably, a single bungee cord runs through: (1) greater than 1, 2, 3, or more sections of the frame and/or (2) along at least two or three axes of the frame, where an axis is a set of at least two linear frame sub-sections. Optionally, several bungee like cords are used. However, one bungee allows for the stroller to be readily handled and assembled. As illustrated, one bungee runs sequentially from the left handle 312, along path A, to a first four way connector 531; along path B, to a second four way fixed wheel connector 534; along path C to a second four way handle connector 535; along path D to a first three way pivot wheel connector 536; along path E to a four connection joint 710; along path F to a second three way pivot wheel connector; along path G to a first four way handle connector 533; along path H to the first four way fixed wheel connector; along path I to the second four way handle connector; and along path J to the second handle 314. By using a bungee through the stroller sub-sections, when the folded stroller, FIG. 9, is released, the stroller optionally and preferably basically self-assembles into the unfolded stroller 230, though a few joints may need human assistance to fully seat/join the adjacent stroller sub-sections.

Example IX

Referring now to FIG. 9, an example of the folded stroller 210 in a folded stroller configuration 900 is illustrated. As illustrated, the roughly cylindrical folded stroller has a height that is about one-third of the unfolded stroller as the frame sections are made of three parts in the exemplary folded stroller 300 and has a diameter of a couple of wheel sizes. In this example, the wheels are a couple of inches in diameter and are optionally roller blade wheels.

Still yet another embodiment includes any combination and/or permutation of any of the elements described herein.

Herein, any number, such as 1, 2, 3, 4, 5, is optionally more than the number, less than the number, or within 1, 2, 5, 10, 20, or 50 percent of the number.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. An apparatus, comprising:
    a baby stroller, comprising:
        a set of handles;
        a set of wheels;
        a foldable frame, said foldable frame comprising at least three hollow tubes and a tensioning cord running through said at least three hollow tubes, said foldable frame attaching said set of handles to said set of wheels, said tensioning cord running from a first front wheel connector, through a four way connector, to a second front wheel connector; and
        a baby seat attached to said foldable frame.

2. The apparatus of claim 1, said tensioning cord comprising at least one of:
    a steel cable;
    an aramid cord;
    a nylon cord;
    a synthetic fiber cord;
    an elastic cord; and
    a bungee cord.

3. The apparatus of claim 1, said foldable frame comprising:
    at least eight hollow tubes, said tensioning cord running sequentially through said at least eight hollow tubes.

4. The apparatus of claim 3, said tensioning cord further comprising:
    a tension of two to five pounds along a linear axis of said at least three hollow tubes of said foldable frame.

5. The apparatus of claim 1, said foldable frame comprising:
    at least fourteen hollow tubes, said tensioning cord running sequentially through said at least fourteen hollow tubes, said tensioning cord comprising a single longitudinal length of cord.

6. The apparatus of claim 1, said foldable frame comprising:
    a side section comprising a connection between a left front wheel of said set of wheels to a left handle of said set of handles, said side section comprising said tensioning cord passing through at least: (1) a first rising tubular section and (2) a second rising tubular section.

7. The apparatus of claim 1, said foldable frame comprising:
    a base section comprising a connection between a first wheel of said set of wheels and a second wheel of said set of wheels, said tensioning cord passing sequentially from a first joint connected to said first wheel, through a first tubular section of said foldable frame, through a base section joint, and through a second tubular section connected to a second joint connected to said second wheel.

8. The apparatus of claim 1, said foldable frame comprising:
    a back section comprising a connection between a back wheel of said baby stroller to a handle of said set of handles, said tensioning cord sequentially passing through said three hollow tubes between said back wheel and said handle.

9. The apparatus of claim 1, said foldable frame comprising:
    a cross member section from a back left wheel of said baby stroller to a right handle of said baby stroller, said tensioning cord sequentially passing through at least said three hollow tubes between said back left wheel and said right handle.

10. The apparatus of claim 1, said foldable frame comprising:
    a path of said tensioning cord passing between each of:
        a first wheel and a second wheel of said set of wheels; and
        a first handle and a second handle of said set of handles.

* * * * *